(12) United States Patent
Sorensen (10) Patent No.: US 11,472,008 B2
(45) Date of Patent: Oct. 18, 2022

(54) WELL ACCESS TOOL

(71) Applicant: Quality Intervention Technology AS, Balestrand (NO)

(72) Inventor: Bjorn Bro Sorensen, Notteroy (NO)

(73) Assignee: Quality Intervention Technology AS, Balestrand (NO)

(*) Notice: Subject to any disclaimer, the term of this patent is extended or adjusted under 35 U.S.C. 154(b) by 534 days.

(21) Appl. No.: 16/489,934

(22) PCT Filed: Mar. 1, 2018

(86) PCT No.: PCT/EP2018/055113
§ 371 (c)(1),
(2) Date: Aug. 29, 2019

(87) PCT Pub. No.: WO2018/158402
PCT Pub. Date: Sep. 7, 2018

(65) Prior Publication Data
US 2019/0389038 A1    Dec. 26, 2019

(30) Foreign Application Priority Data
Mar. 1, 2017 (GB) .................................... 1703297

(51) Int. Cl.
*B25B 23/00*    (2006.01)
*B25B 23/15*    (2006.01)
(Continued)

(52) U.S. Cl.
CPC ...... *B25B 23/0014* (2013.01); *B25B 23/0021* (2013.01); *B25B 23/0028* (2013.01);
(Continued)

(58) Field of Classification Search
CPC ............ B25B 23/0014; B25B 23/0021; B25B 23/0028; B25B 23/15; E21B 17/012; E21B 33/03; F16L 55/132
See application file for complete search history.

(56) References Cited

U.S. PATENT DOCUMENTS 2,250,244 A    7/1941 Yancey
2,501,217 A    3/1950 Hawn
(Continued)

FOREIGN PATENT DOCUMENTS

GB         2546556 A  *  7/2017 ........... E21B 17/025
WO    WO 2012/103449 A1    8/2012
(Continued)

OTHER PUBLICATIONS

International Search Report for International Application No. PCT/EP2018/055113 dated May 18, 2018.
Search Report for GB1703297.0 dated Jun. 22, 2017.

*Primary Examiner* — Aaron L Lembo
(74) *Attorney, Agent, or Firm* — Getz Balich LLC (57) ABSTRACT

A tool for gaining lateral access to a well includes a head portion configured to advance axially forwardly relative to a lateral access passage. The tool includes a first shaft and a shaft assembly including a second shaft. The second shaft is at least partly received in the first shaft so as to be axially forwardly moveable therewith. In use, axial forward movement of the first and second shafts causes forward advancement of the head portion. The second shaft is axially forwardly moveable relative to the first shaft. The first shaft includes an internal thread and the shaft assembly includes an external thread engaging the internal thread of the first shaft so that relative rotation of the internal and external threads causes the axial forward movement of the second shaft relative to the first shaft without rotation of the second shaft relative to the first shaft.

14 Claims, 9 Drawing Sheets

(51) Int. Cl.
  *E21B 17/02* (2006.01)
  *E21B 33/03* (2006.01)
  *F16L 55/13* (2006.01)
  *F16L 55/132* (2006.01)
(52) U.S. Cl.
  CPC ............. *B25B 23/15* (2013.01); *E21B 17/021* (2013.01); *E21B 33/03* (2013.01); *F16L 55/132* (2013.01)

(56) References Cited

U.S. PATENT DOCUMENTS

| | | | |
|---|---|---|---|
| 3,704,729 A | 12/1972 | Tomlinson | |
| 4,460,039 A * | 7/1984 | Knight | E21B 33/068 166/85.4 |
| 5,592,965 A | 1/1997 | Rakieski | |
| 6,289,992 B1 * | 9/2001 | Monjure | E21B 41/0078 166/77.2 |
| 6,470,971 B1 * | 10/2002 | Bridges | E21B 34/02 166/88.4 |
| 8,281,818 B1 | 10/2012 | Vazquez | |
| 9,115,841 B2 * | 8/2015 | Bourne | F16L 55/132 |
| 2002/0157506 A1 | 10/2002 | Schade | |
| 2004/0074549 A1 * | 4/2004 | Allen | F16L 55/132 138/93 |
| 2020/0063514 A1 * | 2/2020 | Sorensen | E21B 19/22 |
| 2021/0102437 A1 * | 4/2021 | Sorensen | E21B 33/068 |

FOREIGN PATENT DOCUMENTS

| | | | | |
|---|---|---|---|---|
| WO | WO-2012103449 A1 * | 8/2012 | ............ | E21B 17/021 |
| WO | WO 2017/129631 A1 | 8/2017 | | |
| WO | WO 2017/129632 A1 | 8/2017 | | |
| WO | WO-2017129631 A1 * | 8/2017 | ............ | F16L 55/136 |

\* cited by examiner

WELL ACCESS TOOL

The present invention relates to a tool for gaining lateral access to a well via a lateral access passage, and to methods of using such a tool.

Wells often have at least one lateral access passage which provides for communication between the inside of the well and the outside. The lateral access passage may consist of a side opening in a well wall, together with a passageway radially outwardly of the side opening. The radially outer passageway extends through a valve projecting radially from the well wall. The valve may be opened to allow communication between the side wall and further radially outward components.

The side openings in some well walls include an internal thread and these provide the option of closing the side opening using a plug which screws into the thread and forms a pressure tight seal.

It is known to provide a tool for gaining lateral access to a well via the passageway through an opened valve in order to screw in or unscrew a plug in the well side opening. The known system involves the use of a telescopic hydraulically operated tool having at its forward end a socket head. The plug has at its rear a hexagonal portion for engagement in the socket head and providing a torque transmitting connection between the socket head and the plug, and forwardly of the hexagonal portion; an annulus into which the socket member can latch.

In a situation where it is desired to screw a plug into the well side opening, the tool is used by mounting a plug on the socket head and then advancing the socket head along the valve passageway until it lands against the well wall. The socket head is rotated to screw the plug into the side opening. The socket member may then be retracted and the tool removed, leaving the plug in place.

If it is later desired to remove the plug then the hydraulic tool is brought into use again. The socket head is advanced forwardly through the passageway until it engages and latches. Once the socket member is latched on it may be rotated to unscrew the plug and then withdrawn to carry the plug rearwardly and out of the passageway.

When the plug is in place and provides a pressure tight sealed closure, the valve on the side of the well, radially outwardly of the now plugged side opening in the well wall, may be removed for servicing or replacement.

It is sometimes desirable to plug a pipe or other line, for numerous reasons. For instance, if work—such as welding—needs to be carried out on a line, a section may need to be isolated from the other sections of the line (which may be pressurised). Further, a plug may simply be used to seal off a line temporarily.

However, due to the shape of the line, it can be difficult to install such a plug. For instance, it is typically only possible to access one side of a plug (the near side to the user) when installing the plug as the far side of the plug is prevented from being accessed by the installer due to the line and the plug itself being in the way.

It is known from WO 2017/129631 to provide a plug for plugging a line. Once the plug is in position, by remotely applying a torque thereto it can be operated to expand radially outwardly and plug the line.

Another situation in which it is desirable to gain lateral access to a well arises when remedial work is to be done inside the well. For example, a tubing hanger inside a wellhead may develop a fault in which it does not seal properly to the wellhead wall. A problem in a seal may arise above or below a side opening in the wellhead wall. In this situation it may be desired to gain access to the wellhead via a passageway in a valve and the side opening in the wellhead wall in order to inject a sealant to the leaking region. A sealant injection member may be advanced through the passageway in the valve and through the side opening, so that it may then discharge sealant into the interior of the wellhead. The sealant may be tailored either to "float" or "sink" so that it reaches the region where a leak has developed.

It is known from WO 2017/129632 to provide a tool for gaining lateral access to a well via a lateral access passage, the tool comprising a head portion and being configured to axially forwardly advance the head portion towards or in the lateral access passage and being configured to transmit rotational drive to the head portion, and the tool comprising a fluid transmission conduit for delivering fluid to or forwardly of the head portion.

Viewed from a first aspect the invention provides tool for gaining lateral access to a well via a lateral access passage, the tool comprising a head portion and being configured to axially forwardly advance the head portion towards or in the lateral access passage and being configured to transmit rotational drive to the head portion and/or to deliver fluid via a fluid transmission conduit to or forwardly of the head portion, and the tool comprising a first shaft and a shaft assembly comprising a second shaft, the second shaft being at least partly received in the first shaft so as to be axially forwardly movable therewith, whereby in use axial forward movement of the first and second shafts causes forward advancement of the head portion, and the second shaft being axially forwardly movable relative to the first shaft, the first shaft comprising an internal thread and the shaft assembly comprising an external thread engaging in the internal thread of the first shaft whereby relative rotation of the internal and external threads causes said axial forward movement of the second shaft relative to the first shaft without rotation of the second shaft relative to the first shaft.

The invention also provides a method of using a tool in accordance with the first aspect of the invention to gain lateral access to a well via a lateral access passage, comprising forwardly advancing the head portion towards or in the lateral access passage, and transmitting rotational drive to the head portion and/or delivering fluid to or forwardly of the head portion.

In embodiments, the first shaft may be advanced together with the second shaft and it may be advanced relative to the second shaft, both without rotation of the first shaft relative to the rest of the tool. This may be beneficial when it is desired to forwardly advance the head portion to an appropriate position before transmitting rotational drive to the head portion and/or delivering fluid via a fluid transmission conduit to or forwardly of the head portion. In the operation of some embodiments, forward advancement of the second shaft relative to the first shaft is carried out before forward advancement of the first shaft and second shaft together.

The external thread may be provided on a nut of the shaft assembly.

The nut may be rotatable relative to the second shaft.

The second shaft may extend forwardly out of the first shaft in pressure tight manner. A region internally of the first shaft may be pressure isolated from a region occupied by a forwardly extending part of the second shaft.

The second shaft may have a smooth outer surface enabling it to be supported for axial movement by passing through a seal in pressure tight manner. Thus, for example, a region forwardly of the second shaft may be exposed to well pressure, but a region rearwardly of the shaft may be isolated from this pressure. The tool may be arranged so that the external thread of the shaft assembly is at all times located rearwardly of the seal.

In the first aspect of the invention, there may be an elongate transmission member connected to the second shaft for transmitting torque to the head portion. There may be a guide for guiding the elongate transmission member in a curved path.

In alternative embodiments, the head portion may be connected to a forward end of the second shaft in axial alignment therewith. The head portion may be connected directly to the forward end of the second shaft, i.e. there may be no elongate transmission member connecting between the second shaft and head portion.

If the tool is configured to transmit rotational drive to the head portion, it may be provided with a socket for rotating a member such as a plug (i.e. the socket may engage with and rotate the member), or it may be provided with a brush for rotation to clean the inside of the lateral access passage. The tool may additionally or alternatively be configured to deliver fluid via a fluid transmission conduit to or forwardly of the head portion, for example to deliver a sealant.

The lateral access passage of a well may be arranged horizontally. The lateral access passage may extend in a radial direction with respect to the well. The lateral access passage of the well may comprise a side opening in a well wall in combination with a passageway radially outwardly of the well wall, which may be a passageway through a valve.

The tool may be used to transmit rotational drive to the head portion, for example to turn a socket member in order to install or remove a plug in a well side opening, or to install or remove a plug for plugging a line as described in WO 2017/129631.

The head portion may be provided with a suitable socket member. The socket member may have a socket for engaging a component for rotation thereof, such as a plug. The rotational drive may also be used to rotate a cleaning device such as a brush provided on the head portion, for example to clean the inside of a side opening, in particular to clean threads of the side opening.

The member to which torque is to be applied may comprise a cleaning device, and the cleaning device may be part of the tool.

It is sometimes the case that there is a limited amount of space in a region adjacent to a member to which torque is to be transmitted. Such situations arise in wells for example. In embodiments having an elongate transmission member and a guide for guiding the elongate transmission member in a curved path, it is possible for at least some of that curved path to occupy the limited space adjacent to the member and for the rest of a tool to be positioned where there is more space.

At least in embodiments of the invention, it is possible for torque applied around a first axis to be delivered as torque applied around a second axis to the head portion, with the first and second axes being different from each other. For example, if there is limited space in a region adjacent to a target member such as a nut or bolt which is to be screwed or unscrewed, the head portion can be positioned on the second axis near to the target member, whilst the source of the torque, such as an electric screwdriver or wrench, can be positioned remote from the target member with its torque output on the first axis.

The guide can be used to determine the curved path for the elongate transmission member. The guide can avoid the elongate transmission member buckling or locking up in response to the application of torque.

The guide may be rigid. The guide may be formed in a predetermined curve. The guide may have a curvature which is variable. The guide may be flexible allowing the curved path to be varied. The guide may be curved in one plane or it may be curved in more than one plane. For example, the guide may curve in a first curve in a first plane and in a second curve in a second plane different from the first plane. Thus the configuration of the guide can be tailored to a particular situation where there is a limited amount of space in a region adjacent to a member to which torque is to be applied, for example.

The elongate transmission member may comprise a plurality of universal joints, which can follow a curved path and transmit torque, for example at least three universal joints. With an increasing number of universal joints, the length of the elongate transmission member which may extend in a curved path increases.

The elongate transmission member may comprise a hose. The hose may be configured to deliver fluid via a fluid transmission conduit to or forwardly of the head portion. The hose may be configured to transmit rotational drive to the head portion. In embodiments, the hose may be configured to deliver fluid via a fluid transmission conduit to or forwardly of the head portion and to transmit rotational drive to the head portion.

The guide may comprise a guide passage along which the elongate transmission member extends. The guide may take the form of a pipe or hose.

The guide passage may be configured to be pressurised. This may for example be particularly useful when the tool is used to gain access to a well via an access passage, because the guide passage can then be connected to the well and exposed to its pressure during a torque delivery operation.

The tool may have a flange or other connecting means for connecting to a site where torque and/or fluid is to be delivered, for example a flange of a well, such as a flange belonging to a valve at the side of a well. The flange or other connecting means may be configured to form a pressure tight connection with the site where torque and/or fluid is to be delivered.

In embodiments having an elongate transmission member, this may be forwardly advanced along the guide before the head portion engages the member. In order for the head portion to locate at a torque delivery site, it may be desirable for it to occupy initially a first position spaced from the delivery site, and then to be advanced forwardly to a second position at the delivery site. The tool may have a main body and the elongate transmission member may be configured to be longitudinally movable relative to the main body. Such an arrangement can permit the head portion to be moved longitudinally.

When a force is applied to the elongate transmission member to move it longitudinally, it will be subject to compressive forces when being moved forwardly and to tensile forces when being pulled rearwardly. In the case of compressive forces, the guide may serve to prevent buckling or locking up of the elongate transmission member, such as a plurality of universal joints or a hose. In the case of tensile forces, the guide may serve to hold the elongate transmission member in a desired curved path.

The tool may be configured to impart torque and/or deliver fluid to the head portion, as well as to impart longitudinal movement to the head portion, via the elongate transmission member. This can be useful when accessing a lateral access passage of a well. The tool may be initially positioned when the access passage is closed by a valve, with the head portion in a first position, and a pressure tight connection may be established between the tool and the access passage. The valve may then be opened, exposing the head portion to well pressure, and allowing the head portion to be forwardly advanced along the access passage to a second position at a site where it is to deliver torque.

The tool may have means for imparting torque to the elongate transmission member. A drive transmission mechanism may be provided to impart longitudinal movement to a rear end of the elongate transmission member.

The second shaft may be connected to the elongate transmission member for imparting torque thereto. The shaft may be longitudinally movable relative to the guide. The shaft may be longitudinally movable relative to a main body of the tool.

The guide may have a rear portion which is straight and a front portion which is curved. This can allow a rear part of the elongate transmission member to be moved in a straight line if it is desired to move the head portion forwardly or rearwardly. An output of a drive mechanism of the tool which imparts longitudinal movement to the elongate transmission member is thus able to move in a simple straight line. As the elongate transmission member is moved forwardly, for example, some of its initially straight length may move from the rear portion of the guide which is straight to the front portion which is curved. As this happens the output of the drive mechanism can still be moving in a straight line.

The invention also provides a method of using a tool as set out above, to gain lateral access to a well via a lateral access passage, comprising guiding the elongate transmission member in a curved path, engaging the head portion with a member to which torque is to be transmitted, applying torque to the elongate transmission member, and transmitting torque via the elongate transmission member to the head portion and to the member. The elongate transmission member may be forwardly advanced along the guide before the head portion engages the member.

The first shaft may forwardly advance the elongate transmission member by axial forward movement of the first shaft. The second shaft may be connected to the elongate transmission member. The tool may be configured so that when it is in a collapsed condition, a substantial part of the length (such as for example 75% or more) of the first shaft may be located in a housing of the tool, and a substantial part of the length (such as for example 75% or more) of the second shaft may be located in the first shaft. Thus the tool may occupy a relatively short length in the axial direction.

Certain preferred embodiments of the invention will now be described, by way of example only, and with reference to the accompanying drawings, in which.

Figure 1:
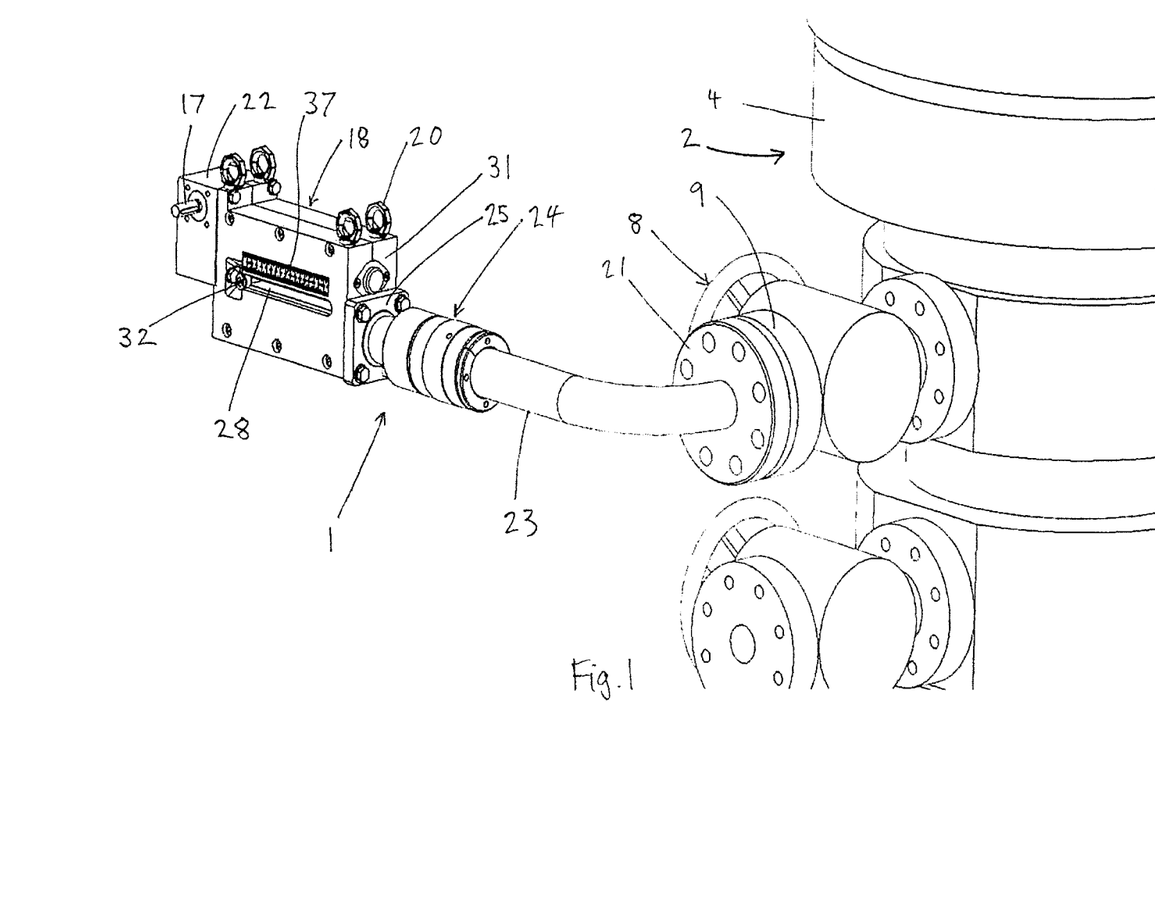
FIG. 1 is a perspective view showing an embodiment of a tool in accordance with the present invention connected to a well head.
Figure 2:
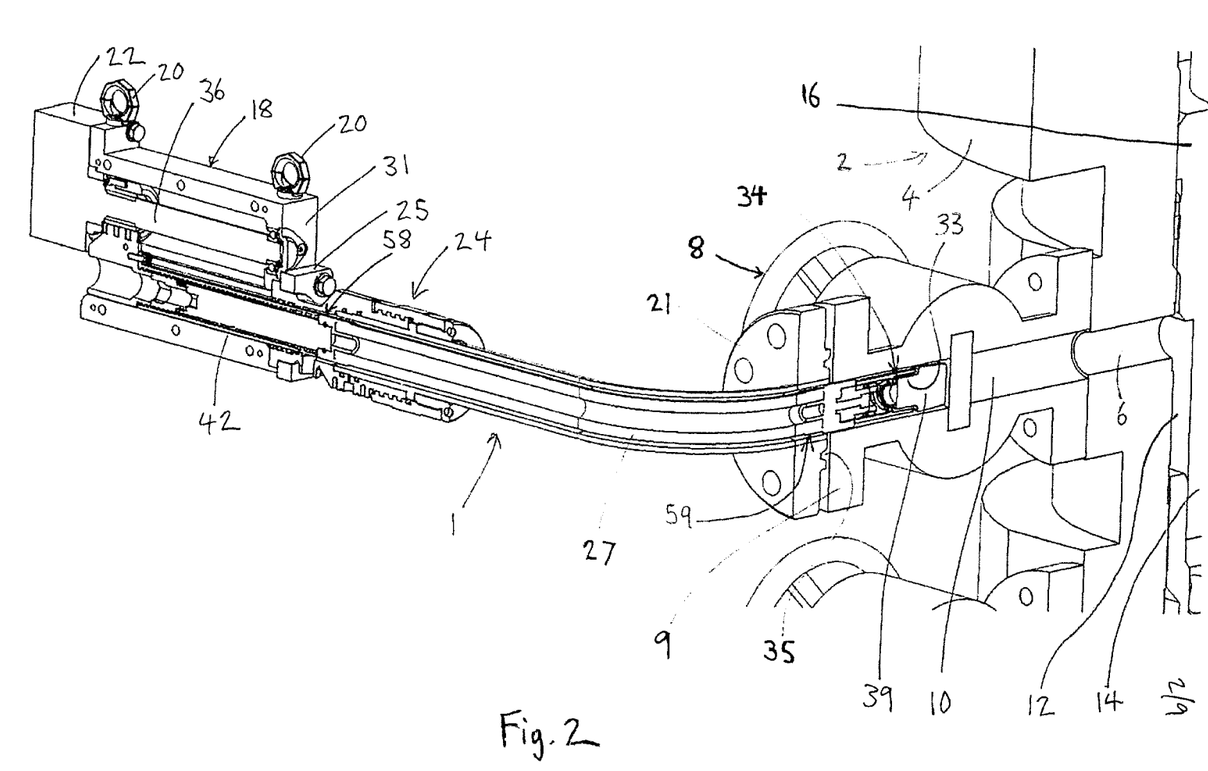
FIG. 2 is a cutaway view of the tool and the wellhead, with the tool in a collapsed condition.
Figure 3:
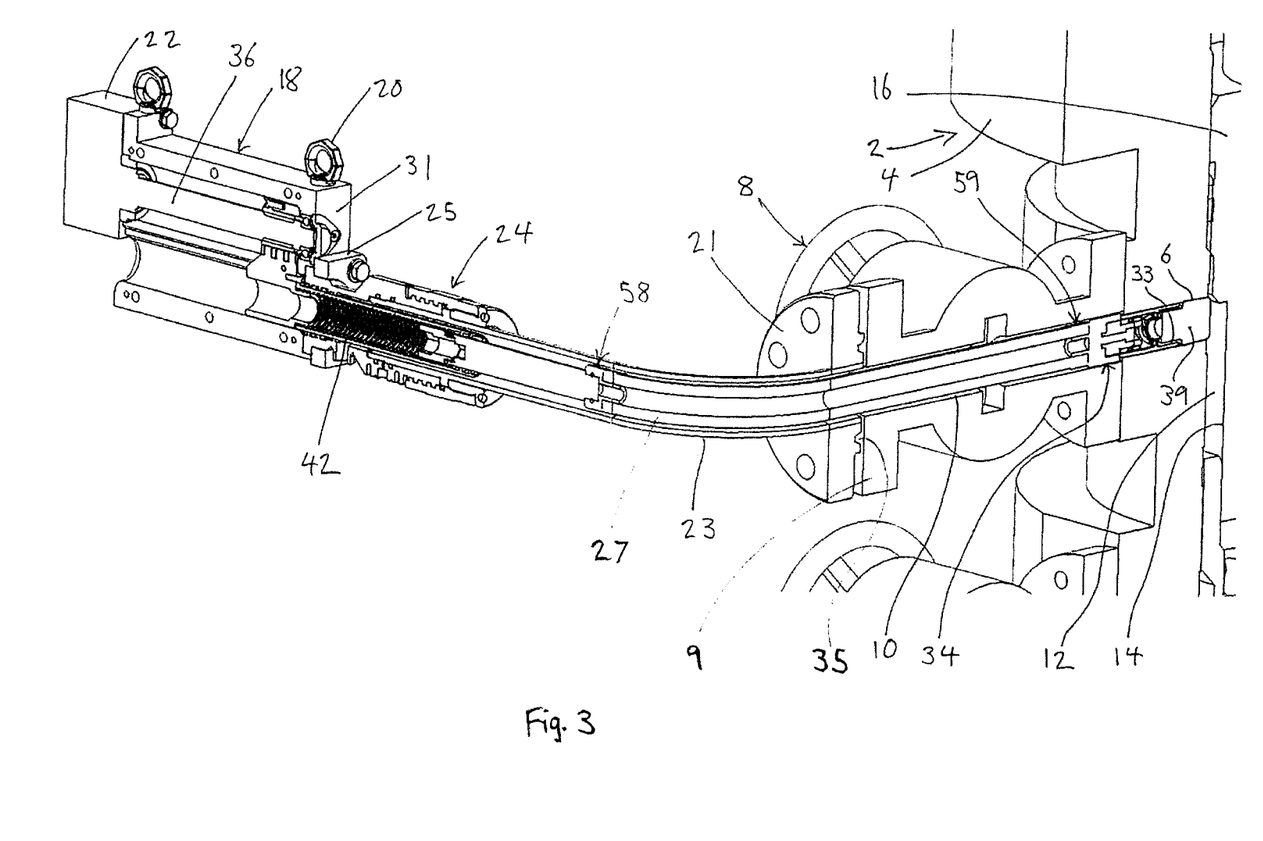
FIG. 3 is a cutaway view of the tool and the wellhead, with the tool in an extended condition.

Referring to FIGS. 1, 2 and 3, these show apparatus comprising a tool 1. The tool 1 is connected to a wellhead 2. The wellhead 2 has an annular outer wall 4 formed with a side opening 6 and a valve 8 having therethrough a passageway 10 which is aligned with the side opening 6 in the outer wall 4.

The passageway 10 and the side opening 6 together form a lateral access passage, which provides access to the outside of the outer wall 4, the inside of the side opening 6, or the space radially inwardly of the side opening.

The valve has a radially outer flange 9. The wellhead 2 has a well casing 14 disposed radially inwardly of the outer wall 4 and an annular cavity 12, known as the annulus, between the well casing 14 and the inside surface of the outer wall 4. The well casing 14 is supported by a casing hanger 16 which is in sealed engagement with the inside surface of the outer wall 4.

In this embodiment, the tool 1 is shown being used to gain access to the annular cavity 12 between the radially outer surface of the well casing 14 and the inside surface of the outer wall 4. In another use of the tool 1, it may gain access to an annulus between a radially outer surface of a production tubing and an outer wall. Such a production tubing may hang from a tubing hanger which is in sealed engagement with the inside surface of the outer wall.

The wellhead 2 is of a standard construction. The valve 8 is normally a gate valve, which when closed shuts off access from the outside to the wellhead side opening 6. In some known designs of wellhead, the side opening 6 includes a thread able to receive a plug. In these systems, the plug closes the side opening and seals the annular cavity 12 from the valve 8. This can allow the valve 8 to be removed and replaced if desired. When is it desired to gain access to the annulus 12, the valve 8 is opened and a tool is inserted through the valve passageway 10 to engage with a hexagonal head of the plug to unscrew it. The tool latches onto the hexagonal head with the aid of a circumferential groove in the head and so is able to withdraw the plug once unscrewed. Thus, access to the annulus via the side opening 6 is achieved. The system also allows for the plug, or a replacement plug, to be passed along the valve passageway whilst held by the tool and then screwed into position in the side opening 6.

The tool 1 will now be described. The tool comprises a housing 18 formed in two parts split generally along a vertical plane in a fore and aft or axial direction of the tool. Each part of the housing 18 has a pair of laterally spaced carrier rings 20 on their respective upper surfaces, giving four carrier rings in total. The housing has a front wall 31 of the housing. At a rear end of the housing, a gearbox 22 is secured. The gearbox has an input shaft 17 to which may be connected a torque wrench. The gearbox is part of a screw jack, described further below.

At the front end of the tool 1, a Quick Test Sub ("QTS") 24, of a type known in the art, is secured by a mounting plate 25 bolted to the front wall 31 of the housing. A guide in the form of a guide pipe 23 is secured in the QTS 24 and projects forwardly therefrom. The guide pipe 23 has a rear portion which is straight extending forwardly of the tool housing 18 and a front portion which is curved. The front portion extends through a 90° bend forwardly of the straight portion, connecting the straight portion to a connecting flange 21 provided at the forward end of the guide pipe 23. The bend may have other angles than 90 degrees. An annular recess 35 (see FIG. 2 or 3) is provided on the front face of the connecting flange 21 for receiving a seal (not shown) for sealing between the connecting flange 21 of the tool and the radially outer flange 9 of the wellhead.

The guide pipe 23 may be rigid or it may be made of a flexible or semi-flexible material. If the guide pipe 23 can be flexed then this may assist in positioning the tool 1 near to a wellhead in order to perform an operation.

A torque transmitting hose 27 of an elongate transmission member extends inside the guide pipe 23 and is connected at its front end to a head portion in the form of a ferrule assembly 34. An example of a suitable hose 27 is Hose Specification 2440N-16V30 as supplied by the Parker Hannifin Corporation. The ferrule assembly 34 has at its forward end a socket 33 in which is received a plug 39, with the plug being latched in the socket 33 in a known manner.

Figure 4:
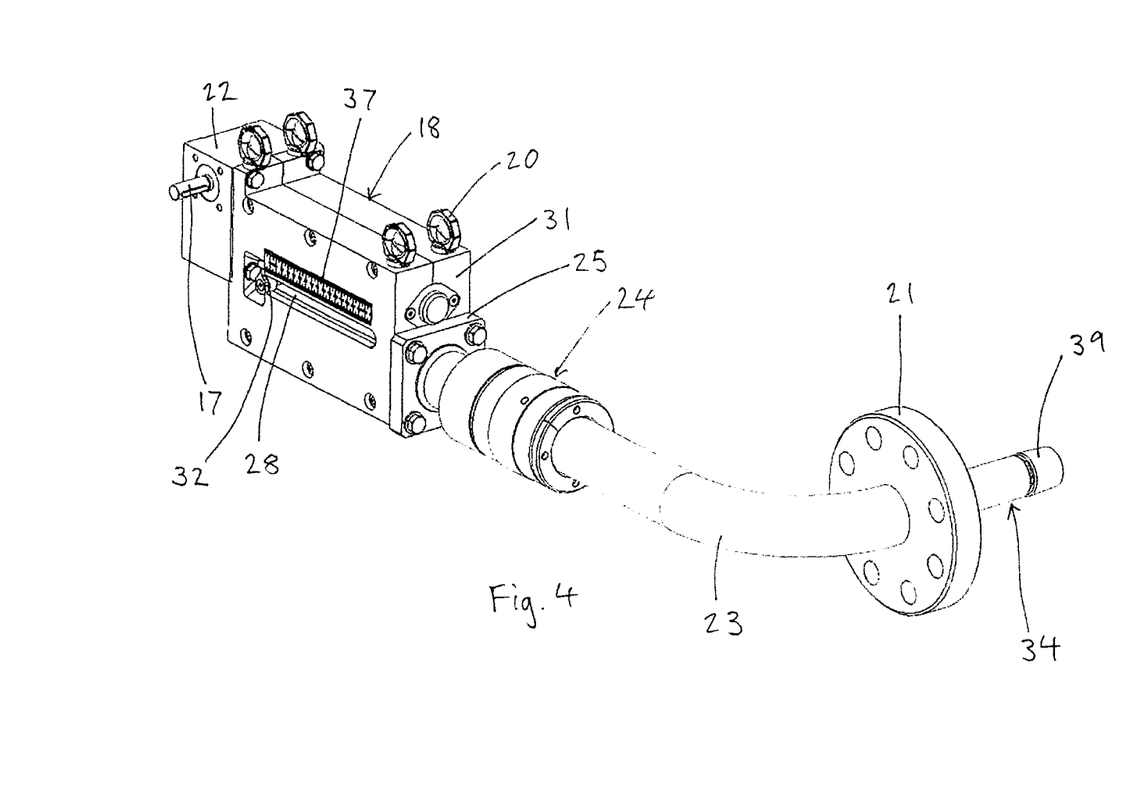
FIG. 4 is a perspective view of the tool.
Figure 5:
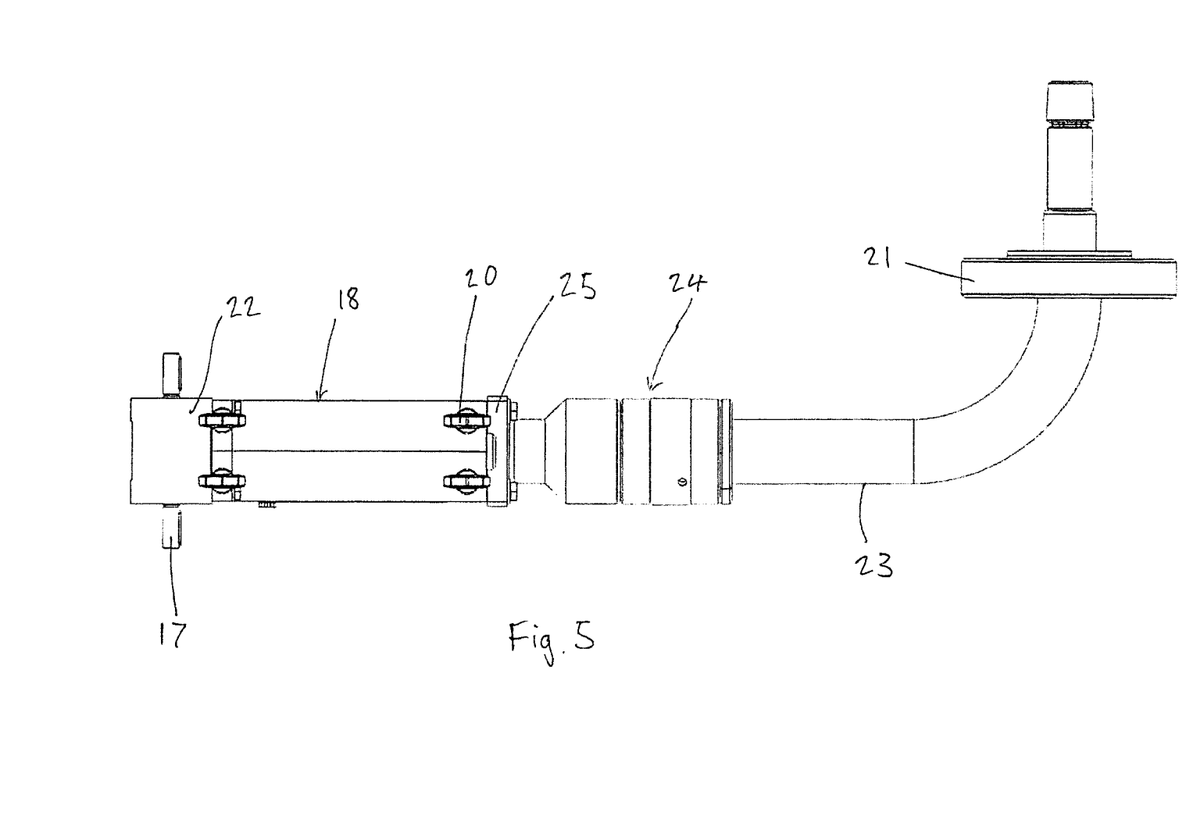
FIG. 5 is a plan view of the tool.

As seen in FIGS. 1 and 4, on one side of the housing 18 a longitudinally extending window 28 is provided. A ruler 37 is fastened to the outside of the housing above and adjacent to the window 28. A pointer 32 projects from the inside of the housing 18 through the window 28 in close proximity to the ruler 37.

FIGS. 2, 3, 6, 7 and 8 show some of the internal details of the tool 1. The screw jack includes the gear box 22 with the input shaft 17. The gear box 22 has a longitudinally extending output shaft 36 formed with an external screw thread. The output shaft 36 is supported for rotation at its forward end by a bearing assembly 38 secured to the front wall 31 of the housing 18. It provides a rotatable drive member which when rotatably driven causes axial forward or rearward movement of a first or outer shaft 42.

An internally threaded nut 40 (see e.g. FIG. 6) of the screw jack engages with the external thread of the output shaft 36. A sleeve 41 is mounted on the nut 40 and is fixed thereto by a screw 26, which holds a forward facing annular flange of the nut axially against a rear facing annular surface of the sleeve. The sleeve is formed with three downwardly directed radial holes 43 in which are loosely received a castellation comprising three upward projections 47. The nut 40 is prevented from rotation by the interengagement of the castellation in the radial holes 47 of the sleeve 41, so that when the gearbox output shaft 36 is rotated the nut moves longitudinally along the shaft.

Figure 6:
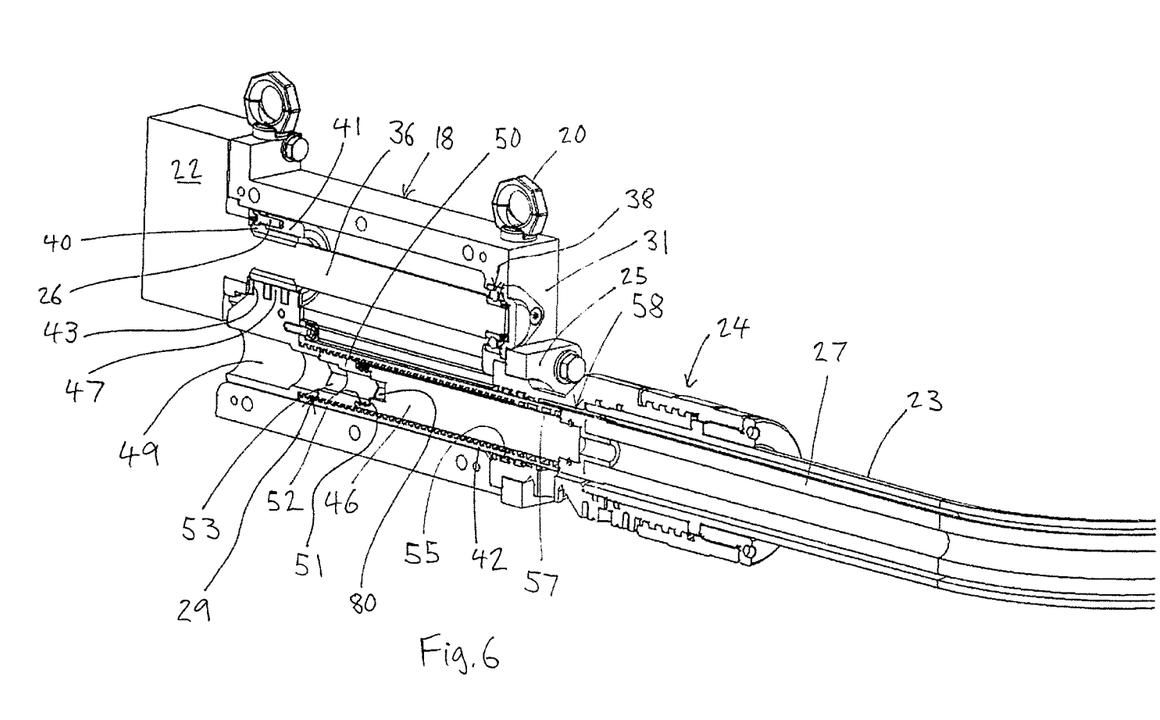
FIG. 6 is a cutaway view of the tool, omitting a front part thereof, in a collapsed condition.

The castellation is part of an axially drivable assembly 49 mounted to a rear end of the outer shaft 42. When the assembly 49 is axially driven forwardly or rearwardly by movement of the nut 40 on the shaft 36 transmitted to the castellation 45, it causes forward or rearward movement of the shaft 42.

Figure 9:
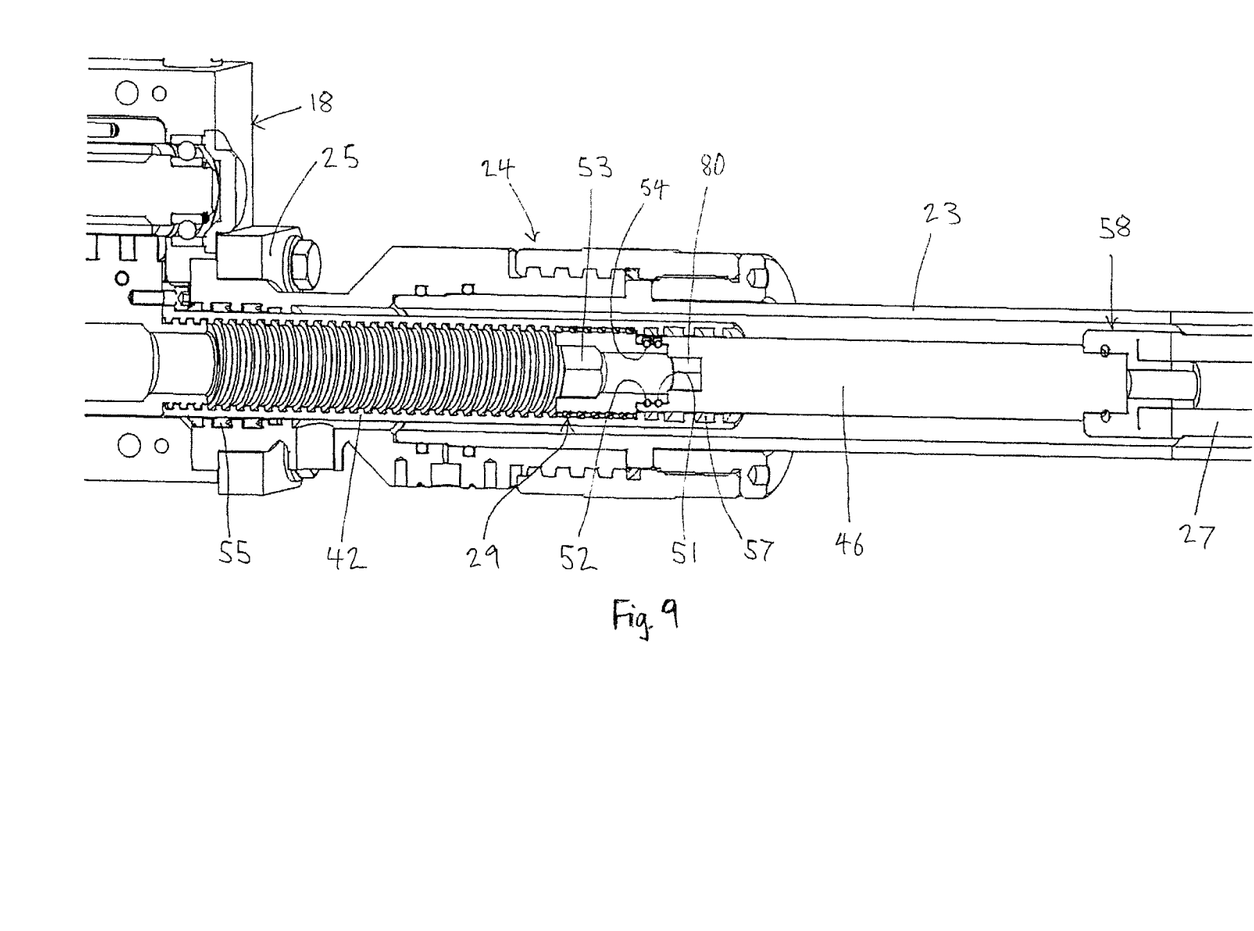
FIG. 9 is a longitudinal cross-sectional view of a part of the tool in the extended condition.

An inner shaft assembly 29 extends inside the outer shaft 42 and comprises a second or inner shaft 46 and a shaft assembly nut 50. The outer shaft 42 is internally threaded and the shaft assembly nut 50 has an external thread engaged with the internal thread of the outer shaft 42. As best seen in the FIG. 9, the shaft assembly nut 50 is provided on an outer surface with a pair of grooves 54 each receiving a respective plurality of balls 51 forming a ball bearing. Each of the pair of ball bearings 51 is engaged with each of a pair of grooves 52 formed on an internal surface of a rear portion of the inner shaft 46. The ball bearings prevent relative axial movement of the inner shaft 46 and the shaft assembly nut 50, but permit relative rotational movement. The shaft assembly nut 50 is provided with a rearwardly facing hexagonal socket 53 for receipt of a corresponding hexagonal head of an elongate tool (not shown) which may be inserted from the back of the tool 1 to rotate the shaft assembly nut 50. The rear end of the inner shaft 46 is provided with a rearwardly facing hexagonal socket 80 for receipt of a corresponding hexagonal head of an elongate tool (not shown) which may be inserted from the back of the tool 1 to rotate the inner shaft 46. The shaft assembly nut 50 has an axial bore allowing access of the tool to the socket 80 of the inner shaft 46 via the length of the nut 50. The hexagonal socket 53 of the nut 50 has a greater diameter than the hexagonal socket 80 of the inner shaft 46.

The inner shaft 46 in this embodiment is a solid bolt, so as to maximise the amount of torque which it may transmit. In other embodiments it may be hollow, in order to allow fluid transmission along its length. In such embodiments, the front end of the inner shaft 46 is connected in fluid tight manner to the hose 27 so as to provide a fluid transmission conduit from the front end of the inner shaft 46 to the ferrule assembly 34. The tool may then be used to deliver fluid via the fluid transmission conduit to or forwardly of the ferrule assembly. Such fluid may for example be for use in a well intervention downhole, or it may be for use locally as a sealant, for example to repair a leak between the outer wall and a well casing or oil production tubing. In order to supply such a hollow shaft 46 with fluid, a suitable hose or pipe may be connected in fluid tight manner at its rear end.

FIG. 6 shows details of the way in which the outer shaft 42 extends out of the housing 18 in sealed manner. A rear portion of the QTS 24 is provided with a pair of seals (not shown) received in respective grooves 55 on an inside surface thereof, the seals engaging a smooth outer surface of the outer shaft 42. Thus when the interior of the guide pipe 23 is exposed to well pressure, the seals in the grooves 55 provide a pressure tight barrier between the interior of the guide pipe 23 and the interior of the housing 18.

Internally of the outer pipe 42, at its front end, the inner shaft 46 passes through a pair of seals (not shown) received in respective circumferentially extending grooves 57 on an inside surface of the outer shaft 42. Thus the seals in the grooves 57 provide a pressure tight barrier between the interior of the guide pipe 23 and the interior of the housing 18.

In view of the seals provided on the inside surface of the QTS 24 and those provided on the inside surface of the outer shaft 42 a pressure tight barrier is provided between the interior of the guide pipe 23 and the interior of the housing 18, so that the interior of the housing 18 is not exposed to well pressure.

The connection 58 between a front end of the inner shaft 46 and a rear end of the hose 27 is of a known crimp-on type suitable for connecting a shaft to a hose. An example of a suitable product to form the connection 58 is crimp-on no. 1Y2LX-16-16C4462 supplied by company Parker Hannifin. The connection is capable of transmitting tension as well as torsion. This is so that when the inner shaft 46 is pulled rearwardly the pulling force can be transmitted to the hose 27 so that it also is pulled rearwardly. In embodiments where the inner shaft 46 is hollow in order to provide a fluid transmission conduit, the connection 58 provides a fluid tight connection.

The connection 59 between the front end of the hose 27 and a rear end of the ferrule assembly 34 is the same as that described above in relation to the rear end of the hose 27. This connection similarly allows for tension as well as torque to be transmitted, as well as allowing fluid transmission in the embodiments having a fluid transmission conduit.

Figure 7:
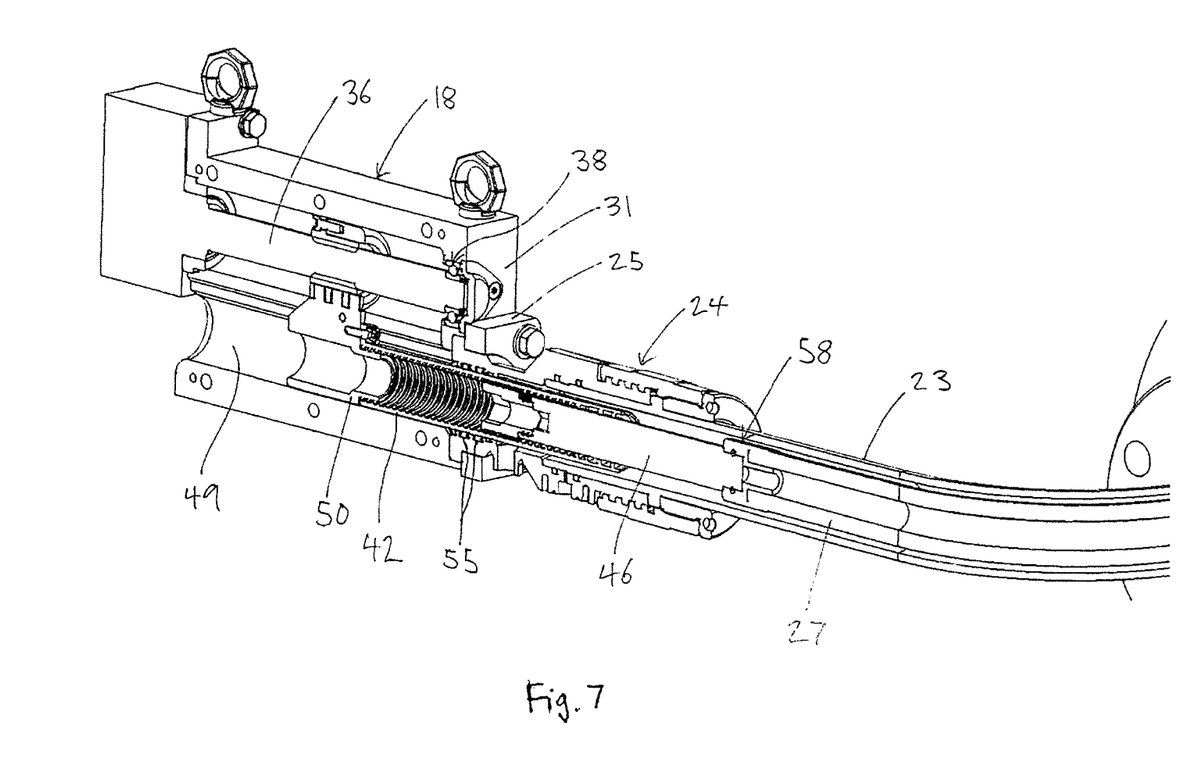
FIG. 7 is a view similar to FIG. 5, with the tool in a condition part of the way to an intermediate condition.
Figure 8:
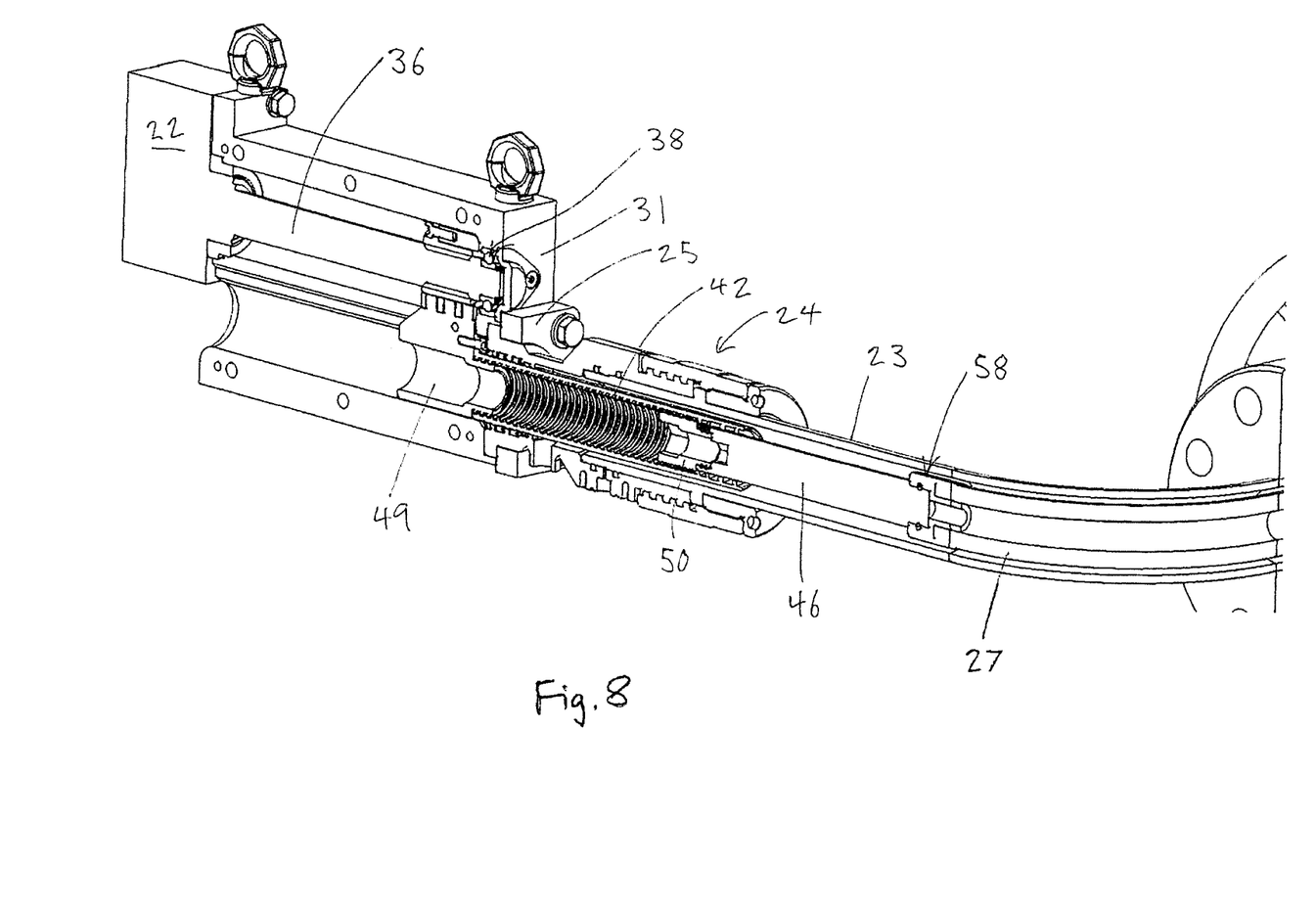
FIG. 8 is a view similar to FIG. 5, with the tool in the extended condition.

The use of the tool will be described with reference to FIGS. 6, 7 and 8. FIG. 6 shows the tool 1 in the collapsed condition. At this stage the outer shaft 42 is at a rearmost position, and the inner shaft assembly 29 including the inner shaft 46 and the shaft assembly nut 50 is also at a rearmost position. As seen in FIG. 2, also at this stage the ferrule assembly 34 projects forwardly out of the connecting flange 21 of the tool and into a radially outer part of the valve passageway 10. A rear part of the hose 27 occupies the straight rear portion of the guide pipe 23, and a front part of the hose occupies the curved front portion of the guide pipe.

A suitable elongate tool (not shown) is then inserted into the rearwardly facing socket of the shaft assembly nut 50 to rotate it. The interengaging external thread of the nut and internal thread of the outer shaft 42 cause the nut 50 to advance forwardly. This causes the inner shaft 46 to advance forwardly without rotation, which in turn advances the hose 27 and the ferrule 34 forwardly. The plug 39 (see FIG. 2) provided at the front of the ferrule assembly 34 is also advanced forwardly along the valve passageway 10. FIG. 7 shows the nut 50 advanced about halfway along the length of the outer shaft 42. When the nut 50 is fully advanced in the outer shaft 42 the tool is in the intermediate condition.

Further forward advancement of the various components is then obtained by inputting a drive to the input shaft 17 of the gearbox 22, which rotates the gearbox output shaft 36 and causes the axially driveable assembly 49 to advance forwardly. This advances the outer shaft 42 and, due to the interengaging external thread of the nut 50 and the internal thread of the outer shaft 42, the inner shaft assembly 29 is also advanced forwardly, without rotation, potentially as far as the fully extended condition of the tool shown in FIG. 8. During this advancement it is possible to monitor the position of the pointer 32 relative to the ruler 37, allowing careful control of the distance of advancement. In practice, the plug 39 will reach a position where it is adjacent to the side opening 6 in the well outer wall 4 before the fully extended condition is reached.

Once the plug 39 reaches the side opening 6, forward advancement is stopped. A suitable tool (not shown) is then engaged in the socket 80 at the rear of the inner shaft 46 and torque is applied. It is able to gain access to the socket 80 via the rearwardly facing hexagonal socket 53 because of the larger diameter of the latter. The torque applied by the tool is transmitted via the hose 27 and the ferrule assembly 34 to the plug 39 which may then be screwed into place in the side opening 6. The socket 33 at the front of the ferrule assembly 34 is unlatched from the plug 39 once screwed in, and then the procedure is reversed to withdraw the hose from outside of the passageway 10. The valve 8 is closed and the connecting flange 21 of the tool is disconnected from the well.

During screwing or unscrewing, the plug 39 moves axially, and axial movement of the socket 33 at the front of the ferrule assembly 34 relative to a rear part of the ferrule assembly, which is connected to the hose 27, can be accommodated by a connection between these two components, which permits relative axial movement but not relative rotational movement.

It will be noted that when the tool 1 is in the collapsed condition shown in FIG. 6 a substantial part of the length of the inner shaft assembly 29 is received in the outer shaft 42, and a substantial part of the length of the outer shaft 42 is received in the housing 18 of the tool. Thus a telescopic assembly is provided, enabling the tool to have a relatively short axial length before the shafts are extended. In embodiments where a QTS is not used, the tool can be very compact in the axial direction.

In some embodiments, a head portion, such as the ferrule assembly described above, may be connected directly to a forward end of the inner shaft, i.e. there may be no hose and guide therefor. Such a head portion may be configured to transmit torque to a member, for example by being formed with a socket for engaging a member in the form of a plug, and/or it may be configured to deliver fluid, such as a sealant. By providing such a tool with a compact arrangement of the outer shaft and the inner shaft assembly as discussed above, the compactness of the tool in the axial direction will be advantageous where the tool is to be aligned with a radial direction of a well, rather than perpendicularly thereto as in the illustrated embodiment. If there is a shortage of space radially outwardly of a well, then such embodiments may be used to access the well via an access passage with the tool aligned with a radial direction of the well. The telescopic assembly allows the tool to fit into a relatively small amount of space.

The invention claimed is:

1. A tool for gaining lateral access to a well via a lateral access passage, the tool comprising a head portion and being configured to axially forwardly advance the head portion towards or in the lateral access passage and being configured to transmit rotational drive to the head portion and/or to deliver fluid via a fluid transmission conduit to or forwardly of the head portion, and the tool comprising a first shaft and a shaft assembly comprising a second shaft, the second shaft being at least partly received in the first shaft so as to be axially forwardly movable therewith, whereby in use axial forward movement of the first and second shafts causes forwardly advancement of the head portion, and the second shaft being axially forwardly movable relative to the first shaft, the first shaft comprising an internal thread and the shaft assembly comprising an external thread engaging in the internal thread of the first shaft whereby relative rotation of the internal and external threads causes said axial forward movement of the second shaft relative to the first shaft without rotation of the second shaft relative to the first shaft, wherein the external thread is provided on a nut of the shaft assembly.

2. The tool as claimed in claim 1, wherein the nut is rotatable relative to the second shaft.

3. The tool as claimed in claim 1, wherein the second shaft extends forwardly out of the first shaft in a pressure tight manner.

4. The tool as claimed in claim 3, wherein the second shaft has a smooth outer surface enabling it to be supported for axial movement by passing through a seal in said pressure tight manner.

5. The tool as claimed in claim 1, configured so that the first shaft may be advanced together with the second shaft and the first shaft may be advanced relative to the second shaft, both without rotation of the first shaft relative to the rest of the tool.

6. The tool as claimed in claim 1, comprising an elongate transmission member connected to the second shaft for transmitting torque to the head portion.

7. The tool as claimed in claim 6, comprising a guide for guiding the elongate transmission member in a curved path.

8. The tool as claimed in claim 7, wherein the guide comprises a passage along which the elongate transmission member extends.

9. The tool as claimed in claim 8, wherein the passage is configured to be pressurized.

10. The tool as claimed in claim 7, wherein the guide has a curvature which is variable.

11. The tool as claimed in claim 7, wherein the guide has a rear portion which is straight and a front portion which is curved.

12. A method of using a tool as claimed in claim 7 to gain lateral access to a well via a lateral access passage, comprising guiding the elongate transmission member in a curved path, engaging the head portion with a member to which torque is to be transmitted, applying torque to the elongate transmission member, and transmitting torque via the elongate transmission member to the head portion and to the member.

13. The tool as claimed in claim 1, configured to transmit rotational drive to the head portion, wherein the head portion is provided with a socket for rotating a member.

14. A method of using a tool as claimed in claim 1 to gain lateral access to a well via a lateral access passage, comprising forwardly advancing the head portion towards or in the lateral access passage, and transmitting rotational drive to the head portion and/or delivering fluid to or forwardly of the head portion.

* * * * *